March 11, 1958     C. F. SCHMIDT     2,826,335
SEED PLANTING MACHINE
Filed Sept. 28, 1956     4 Sheets-Sheet 1
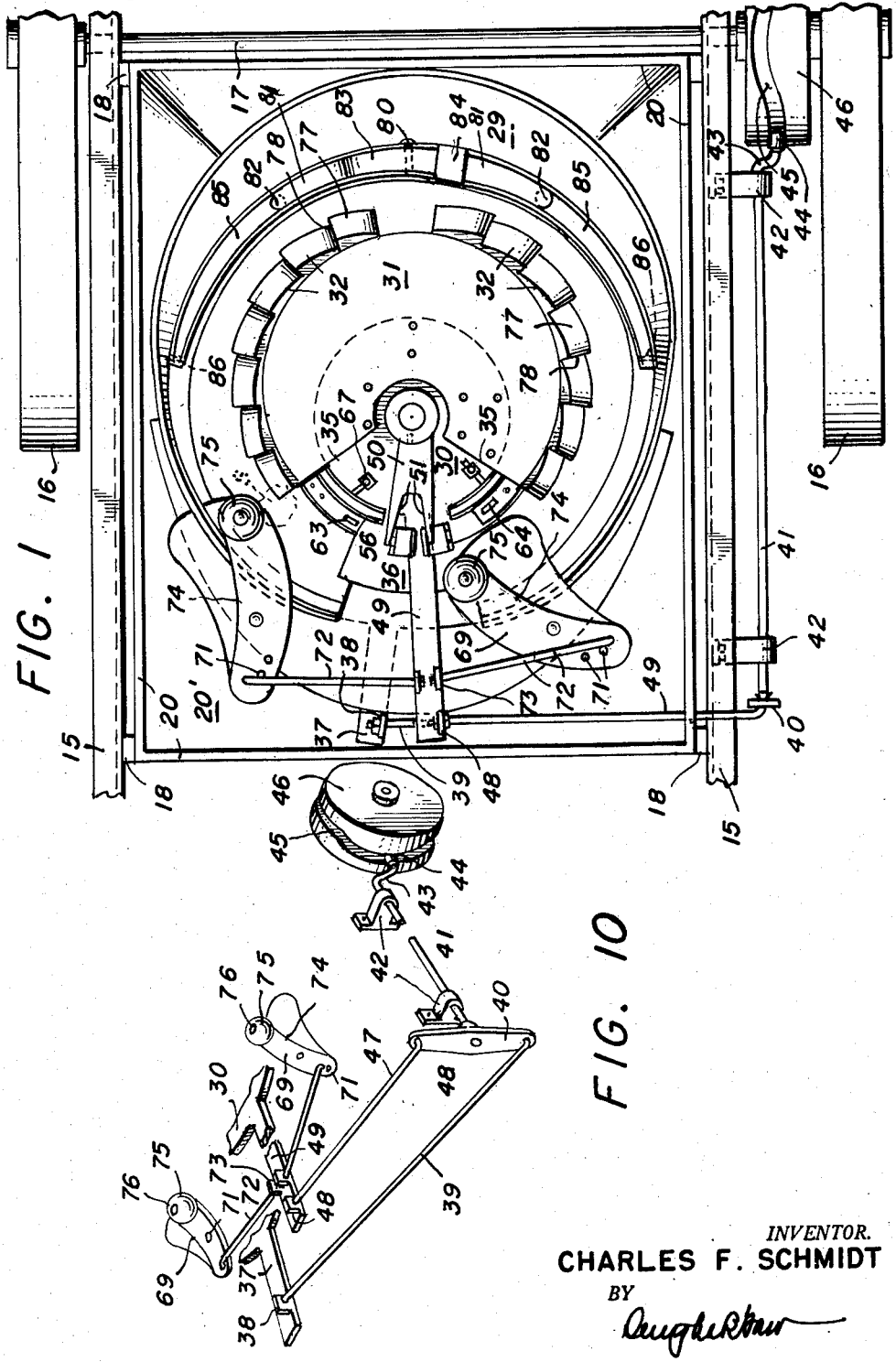
INVENTOR.
CHARLES F. SCHMIDT
BY
ATTORNEY

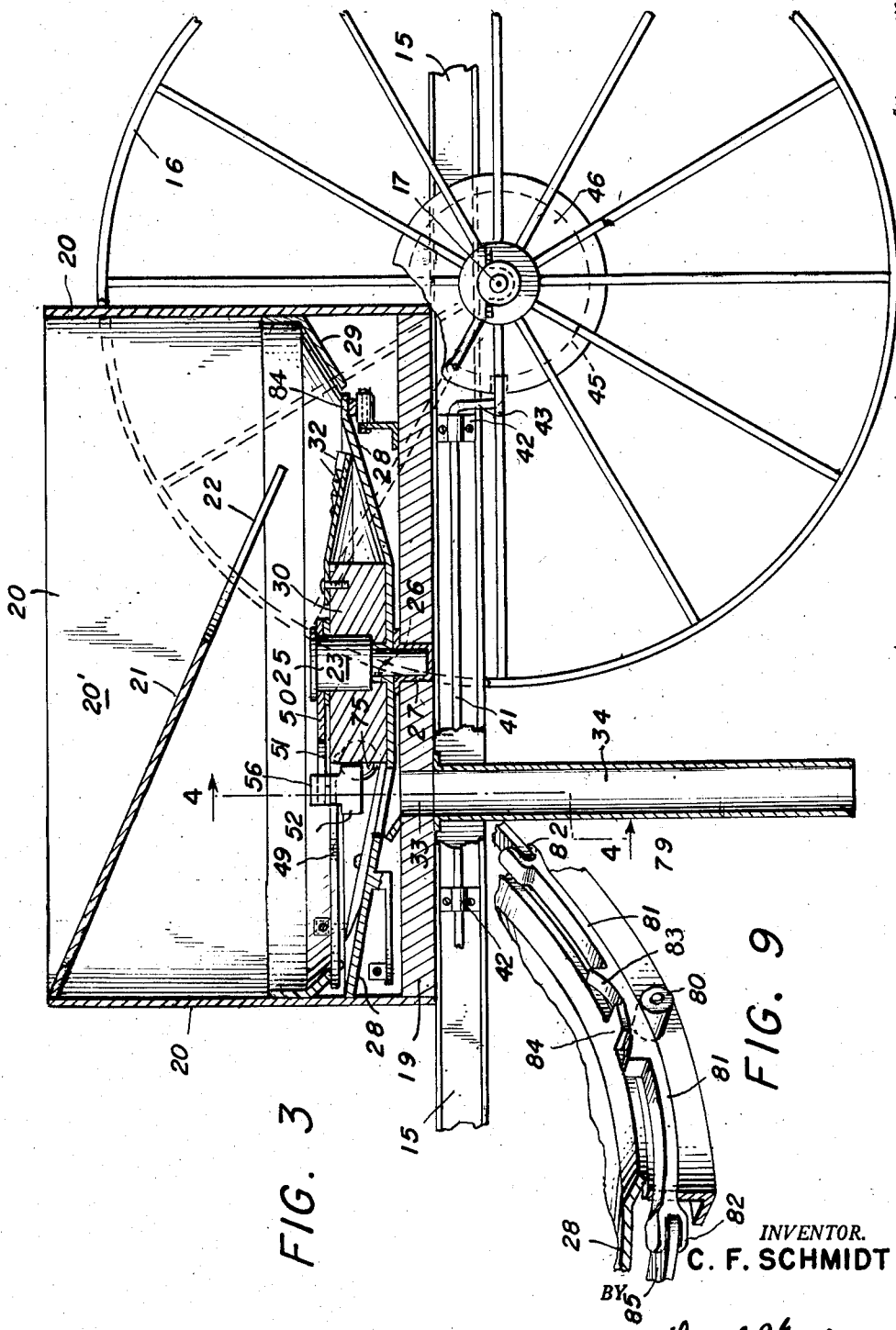

March 11, 1958  C. F. SCHMIDT  2,826,335
SEED PLANTING MACHINE
Filed Sept. 28, 1956  4 Sheets-Sheet 3
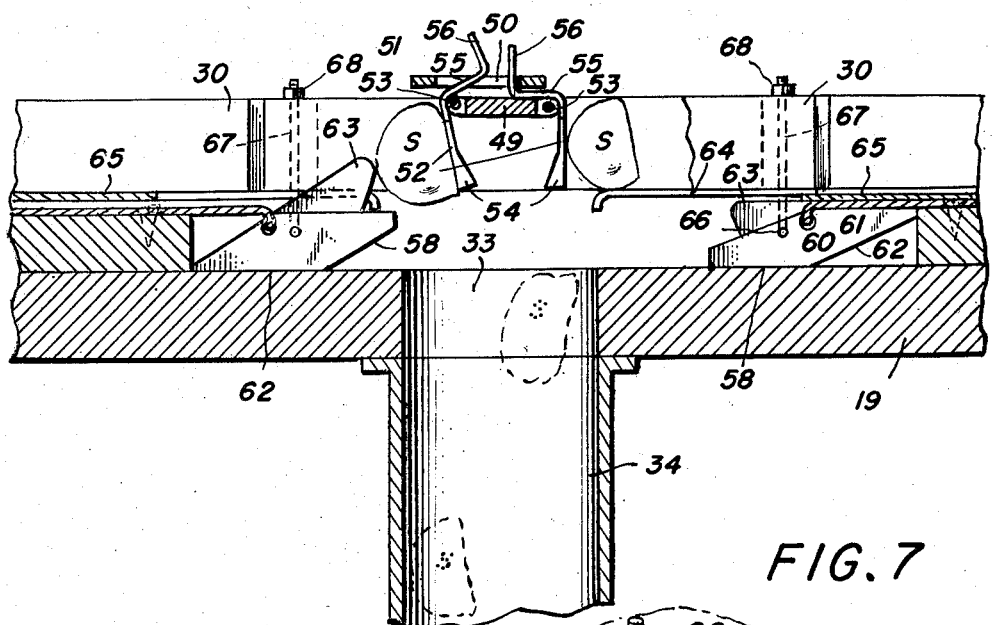
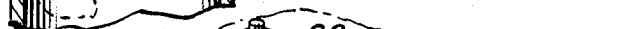
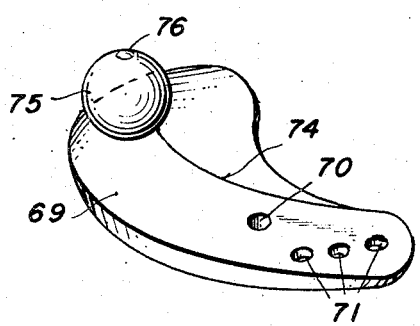
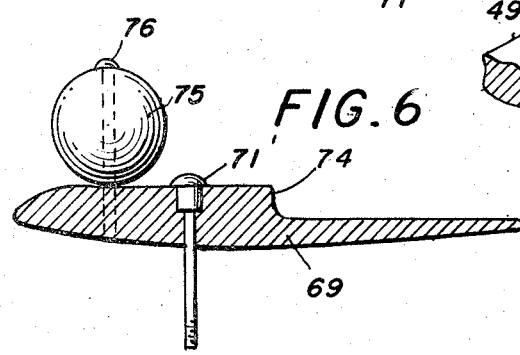
INVENTOR.
CHARLES F. SCHMIDT
BY
ATTORNEY March 11, 1958

C. F. SCHMIDT 2,826,335

SEED PLANTING MACHINE

Filed Sept. 28, 1956

INVENTOR.
CHARLES F. SCHMIDT
BY

ATTORNEY

United States Patent Office 2,826,335
Patented Mar. 11, 1958

2,826,335

SEED PLANTING MACHINE

Charles F. Schmidt, Jeffersontown, Ky.

Application September 28, 1956, Serial No. 612,799

16 Claims. (Cl. 221—185)

This invention pertains generally to seed planters and is particularly adaptable to the planting of seed potatoes.

An object of the invention is to provide a seed planter for use upon a suitable vehicle and involving the usual discharge chute or pipe, and wherein improved means are provided for insuring the feed of the seed to the chute one at a time and against the possibility of delivery of more than a single seed to the chute in its operation.

A further object of the invention is to provide a seed planter of the type generally stated which includes a hopper or bin to contain the seed, wherein the seed rests upon a movable feeder head equipped with means for agitating the seed, for feeding the seed in a constant stream to the discharge opening or chute, to maintain the chute in closed position until the proper interval has passed for the feeding of the seed, for automatically opening the chute to the passage of a seed at the proper time, to force the seed properly into the chute and to withhold the feed of any additional seed until the initial seed has passed to the chute.

A still further object of the invention is to provide a seed feeding mechanism carried by a vehicle, wherein all movements and operations of the feeding mechanism are powered by the vehicle as it travels over the ground, and wherein the parts are so arranged as to insure the feed of a single seed at proper times without danger or possibility of double planting.

A still further object of the invention is to provide a seed planter fully capable of carrying out the above stated purposes, which is capable of being so adjusted as to bring about a seed planting operation at desired intervals.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawing:

Fig. 1 is a top plan view, with the hopper removed, of a seed planter constructed in accordance with the invention, the same being illustrated as mounted upon a familiar wheel supported vehicle, Fig. 2 is a similar view of the planter with the hopper applied, Fig. 3 is a longitudinal sectional view taken through the median line of the planter as illustrated in Fig. 2, Fig. 4 is an enlarged transverse sectional view taken substantially upon line 4—4 of Fig. 3.

Fig. 5 is a perspective view of one of the kicker members,

Fig. 6 is a longitudinal sectional view through the kicker of Fig. 5,

Fig. 7 is a fragmentary detail perspective view of one of the feeder toes,

Fig. 8 is a fragmentary perspective view illustrating the gates or closure members for the feed chute, Fig. 9 is a detail fragmentary perspective view illustrating the seed agitator, and Fig. 10 is a detail fragmentary perspective view illustrating the means whereby power may be transmitted from the vehicle to the several elements of the feeding mechanism.

Figure 2:
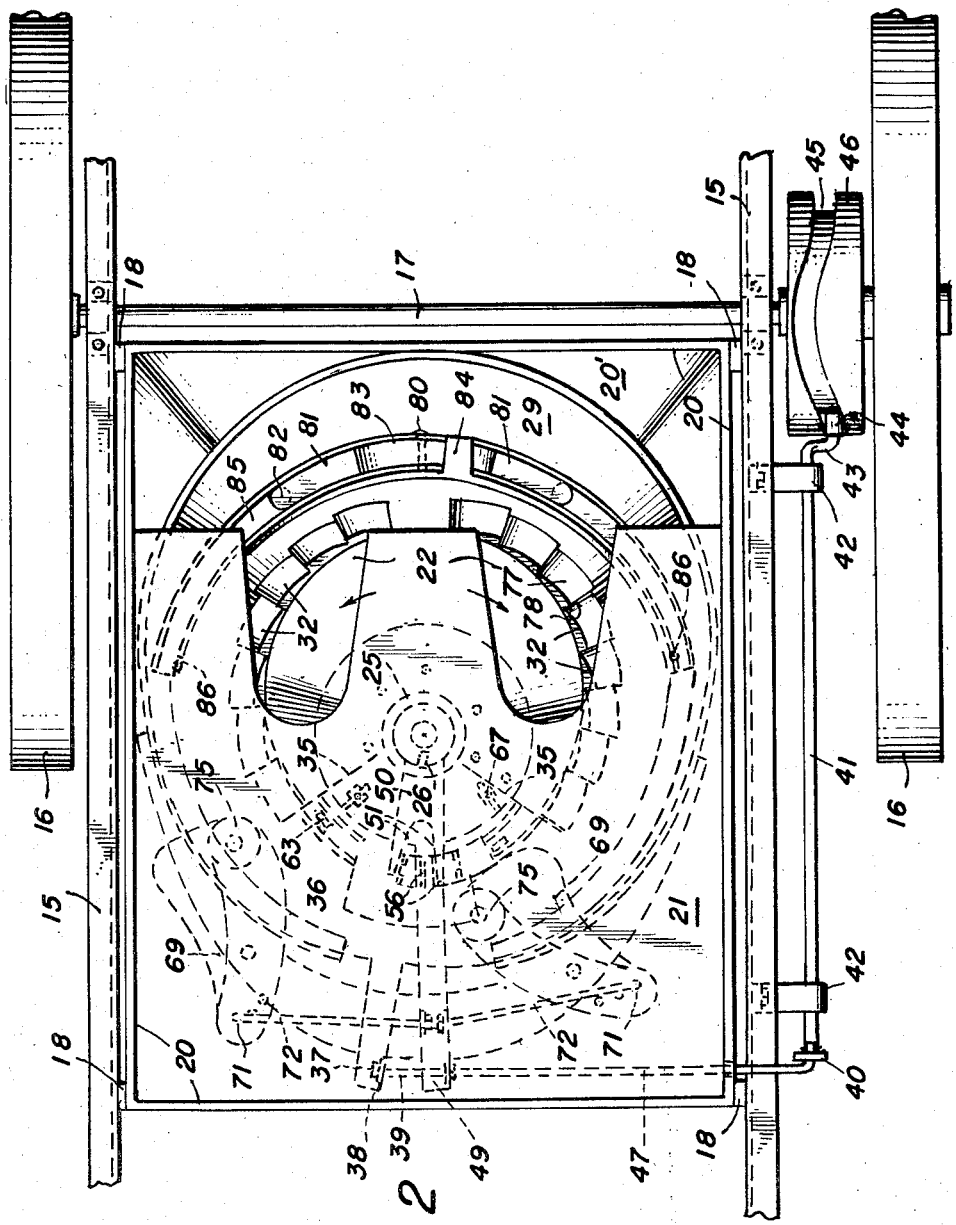

The invention pertains generally to that type of seed planter disclosed by my earlier patent, Reissue 21,537, dated August 20, 1940; the present invention being directed to improved means for bringing about the planting of a single seed in each feeding cycle, with the assurance that the seed will be properly delivered to the feeder chute and against the possibility of additional seed being delivered to the chute in the cycle. While the present invention is designed particularly for planting more or less bulky seed, such as potato, it will be understood that the machine is not necessarily restricted to such use as with minor changes in detail it may be adaptable to the feeding or delivery of seed of different kinds in planting operations. The invention will be described here as a seed planter with this reservation in view.

The vehicle here employed in connection with the improved planter includes spaced horizontally disposed sills 15 which are supported by the traction wheels 16 mounted upon the laterally disposed axle 17 mounted in suitable bearings upon the frame. Mounted upon this frame adjacent to the axle 17 is the housing 18 for the planter mechanism. This housing will be of sufficient size and construction to adequately accommodate the planting mechanism. The housing includes a platform 19 which may be of rectangular shape, from the sides and ends of which the walls 20 extend in an upward direction to provide a hopper or bin 20' for the reception of the seed to be planted. The interior of this housing is provided with a hopper plate 21 extending from the upper end of one wall 20 in a downward and rearward direction within the bin and providing recesses 22 at its lower end as shown more particularly in Fig. 1 of the drawing. This bin has arranged therein at its bottom the feeder mechanism now to be described, and it will be understood that the seed potatoes are poured into the top of the hopper and upon the plate 21, passing therefrom beyond the end of the plate and through the gaps or recesses 22 to the underlying feeder mechanism.

Mounted centrally within the bin and upon the platform 19 thereof is an upstanding bearing post 23 which is rotatably mounted in the socket 24 in the platform. This post includes an enlarged portion 25 which carries a depending key 26 engageable in a suitable recess in a bed member 27 of arcuate configuration disposed horizontally upon the platform 19. This bed is provided with upwardly inclined walls 28 which coincide at their outer ends with a guide plate 29 extending inwardly from the side and end walls 20 of the bin.

Mounted for oscillatory movement upon the bed 27 is the seed feeding head 30 which is provided with a central aperture for the reception of the shouldered member 25 of the post 23. This head has affixed thereto an outwardly and downwardly directed feeder plate 31, the outer edges of which are in close proximity to the wall 28 of the bed. The outer edge of this feeder plate is provided with upstanding feeder fingers 32, the purpose of which will be described later. The head 30 and feeder plate 31 take the same general configuration in plan as the bed 27 and wall 28, and underlie the hopper plate 21 which is spaced thereabove.

Forwardly of the post or bearing 23 the platform 19 is provided with an opening 33 which is in registry with a feed chute or pipe 34, the lower end of which terminates a proper distance above the ground. It is through this opening and pipe that the seed potatoes are dropped in the planting operation. The opening 33 in the platform terminates adjacent to the forward edge of the head 30, and this head is cut away near its forward end as at 35 to provide abrupt shoulders as shown more particularly in Figs. 1 and 2 of the drawing. The feeder plate 31 terminates at its forward edges in alignment with the shoulders 35. The bed plate 27 is provided near its forward end with an enlarged opening indicated at 36 and which overlies the opening 33 in the platform 19. The opening 36 is somewhat larger laterally than the opening 33. The bed plate 27 is also provided near its forward end and preferably upon its undersurface with a forwardly projecting arm 37 having an upstanding lug 38 near its forward end to receive one end of a power transmitting rod 39 disposed laterally of the vehicle. The opposite end of this rod pivotally connects with a cross arm 40 secured intermediate its ends to an oscillatory rod 41 disposed longitudinally of the vehicle frame and mounted thereon in bearing brackets 42. The rear end of the oscillatory arm is provided with a crank 43 whose free end is equipped with a roller 44 engaged in a cam groove 45 in a disk 46 secured to the axle 17. The opposite end of the cross arm 40 has pivotally secured thereto one end of a second rod 47 also disposed transversely of the vehicle and connected at its inner or opposite end to an upstanding lug 48 secured to a finger 49 projecting forwardly from the feeder head 30. From this construction it is apparent that as the vehicle advances over the ground, power will be transmitted from its axle to the cam disk 46, whereupon oscillatory movement will be created in rod 41 and transmitted through rods 39 and 47 to the arm 37 and the finger 49, respectively. Moreover, it will be observed particularly with reference to Fig. 10 of the drawings, that as the arm 37 moves in one direction, the finger 49 will be moved in the opposite direction. It will also be observed that as the arm 37 and the finger 49 are rigidly secured respectively to the bed plate and feeder head, these latter elements will move accordingly.

Secured to the upper end of the portion 25 of the post 23 and projecting forwardly therefrom above the feeder head is a fork 50 providing at its free end the spaced arms 51 disposed above the opening 36 in the bed plate. Mounted upon the forwardly projecting finger 49 and near the inner end thereof are a pair of gates indicated at 52, one upon each side of the finger and depending therefrom. These gates are pivoted at their upper ends as at 53 to the sides of the finger 49 so as normally to depend therefrom; weights 54 at the lower ends of the gates bringing about this action. The upper ends of the gates are bent inwardly so as to provide plate portions 55 disposed horizontally over the upper surface of the finger 49; the inner extremities of these plate portions being bent upwardly to provide vertically disposed lugs 56. These lugs are disposed between the fingers 51 of the forwardly projecting fork 50 above the feeder head. The distance between the fingers 51 of the fork is such that in alternate movements of the fork one finger will overlie a plate portion 55 of a gate and maintain the latter against any swinging movement, while the opposite fork finger will have passed beyond the upper surface of the opposite plate portion 55 allowing free swinging movement of the depending gate 52. When the fork moves in the reverse position, a reverse action obviously will occur.

The bed plate 27 is provided with seed feeder toes 57, one disposed on each side of the feeder opening 36 and movable concentrically with the post 23. These toes are mounted one on each side of and feed in the direction of the opening 33 of the platform 19. Each toe has a flat undersurface 58 which rests and slides upon the platform 19, being provided in its upper surface with a transverse recess 59 to receive the downturned lug 60 projecting forwardly from a plate 61 carried by the bed 27. Each toe has a rearwardly and upwardly inclined surface 62 which merges with the base 58 substantially midway the ends of the toe and directly below the kerf or recess 59. The forward downwardly extending face of the toe is provided with a projection 63 normally underlying an arcuate slot 64 in a plate 65 secured to the underside of the feeder head 30. Forwardly of the intersection of the surfaces 58 and 62 the lower end of a horizontally disposed rod 66 is rotatably mounted. The opposite end of this rod is bent at right angles and upwardly as at 67 and is locked by a nut 68 in the overlying feeder head. This arrangement is such that as the bed 27 moves its feeder toe in the direction of the opening, the toe will rock to the position shown at the left of Fig. 4 of the drawings, that is, with its inclined surface 62 in engagement with the platform 19 and with the forward end of the toe in raised position to move the projection 63 through the slot 64 in the plate 65. When moved in the reverse direction, the toe will be retracted from the opening 33 and will tilt to the reverse position as shown to the right of Fig. 4 so that the projection 63 will be retracted through the opening 64 in the overlying plate 65. The feeder toes 57, being freely rotatable upon their respective rods 66, will rock thereon to bring about projection of the element 63 through the openings 64, or retraction of these elements from the arcuate slots depending upon the direction of movement of the bed plate. It will be observed that as a feeder toe moves arcuately in the direction of the feeder opening 33, the projection 63 thereof will extend upwardly through the slot 64 so as to engage behind a seed potato indicated at S supported by the bed plate 27 and will move the seed against the adjacent gate 52. At such time, the tine or finger 51 of the forwardly projecting fork 50 will have moved to such position as to pass beyond the upper end 55 of the gate thus freeing the gate for swinging movement upon its pivot 53. The seed S impelled by the forwardly advancing projection 63 of the feeder toe will engage the gate in the manner shown in Fig. 4, moving the gate to open position to allow the seed to drop through the opening 33 and into the chute 34. However, the gate on the opposite side of the finger 49 will have been locked against swinging movement to prevent the feeding of a seed S from the opposite side of the opening 33, due to the fact that the finger or tine 51 will overlie the horizontal plate portion 55 thereof to maintain its attached gate against swinging movement. Continued movement of the vehicle, however, will bring about a reversal of this operation as will be understood, thus insuring alternate feeding of seeds S from opposite sides of the opening 33.

To further insure proper feeding of seeds S to a position immediately in advance of the projections 63 of the feeder toes, a selector plate is arranged upon the oscillatory bed plate 27 one adjacent to each side of the opening 33. These selector plates indicated at 69, are arcuate in shape and each is provided inwardly from one end with an opening 70 for the reception of a pivot pin affixed in upstanding position to the downwardly inclined underlying bed plate 27. One end of each selector plate is provided with a series of openings indicated at 71, in one of which is engaged the downturned end of a connecting rod 72, the opposite end of which is secured suitably to an upstanding lug 73 on the forwardly projecting finger 49. The upper surface of each selector plate is beveled as at 74 in a downward direction toward that side of the plate against which the seed S are moved in their travel toward the opening 33. The opposite end of the selector plate is provided with an upstanding selector element or knob 75 which may be in the form of a ball, preferably of rubber or similar soft material, secured to its supporting plate by a shaft 76. The pivotal arrangement of the selector plate is such that the selector knob 75 is withdrawn from the path of travel of seed toward the discharge opening 33 when the seed is being advanced in that direction, but will swing upon its pivot in an arcuate and inward direction when the bed plate moves in a reverse direction. When this occurs, the selector element 75 engages behind adjacent seed forcing the foremost thereof into the path of the feeder toe 57 to be forced thereby against the gate 52 adjacent thereto, holding the following seed against passing through the swinging gate 52 when it is liberated for swinging action. It will be observed from the drawing that the movements of these selector plates are synchronized with the movement of the forwardly projecting arm 49, alternately moving to bring about their selector action as the arm 49 swings back and forth. The upper surface of the selector plate being beveled in the manner shown, tends to force any seed resting thereon inwardly into the path of the feed fingers 32 as the head oscillates, thus insuring the passage of the seed in their forward movement in the hopper into the path of the feeder toes 57 heretofore described. The openings 71 in the selector plate are to provide means whereby the throw of the plate 69 may be varied to compensate for the feeding of seed of varying sizes.

The feeder fingers 32 at the outer edge of the feeder plate 31 of the head are provided with beveled or inclined upper faces 77 which terminate in abrupt shoulders 78 on the advancing side of these fingers so that seed engaged thereby will be carried only in a forward direction toward the discharge opening 33 as the head oscillates. Inasmuch as the feeder plate 31 inclines downwardly from the head 30, the seed within the hopper will tend to gravitate toward the outer edge of the feeder plate from which the feeder fingers 32 rise. From this arrangement it is apparent that the feeder fingers will underlie the lowermost of seed and operate upon the latter to move them to the feed chute as the head alternately rotates.

The guide plate or apron 29 within the hopper is downwardly inclined as shown more particularly in Fig. 3 of the drawing in order to channel the seed for flow toward the feeder fingers 32 of the feed plate. However, in order to prevent seed from engaging between the bed plate 27 and the edge of the apron or guide plate 29, an agitator is provided. At the rear of the hopper and rising therefrom intermediate the sides thereof is a support 79 having a horizontally disposed pivot 80 located in the longitudinal center of the hopper and immediately beneath the rear end of the wall 28 of the bed 27. This pivot rockably supports a laterally disposed arm 81, the outer ends of which are each provided with a fork 82 as shown more particularly in Fig. 9 of the drawings. The medial portion of this arm 81 is provided on its upper surface with an arcuate bearing face 83 upon which rests an operating finger 84 projecting rearwardly from the wall 28. It is obvious from this construction, therefore, that as the bed 27 oscillates, the operating finger 84 will ride upon the arcuate bearing surface 83 of the arm 81, causing the latter to rock upon its pivot 80, thus moving the forked ends 82 of the arm alternately in up and down directions.

The forks 82 receive between them adjacent ends 85 of arcuate rocker bars pivoted at their opposite ends as at 86 within the hopper. It will be observed, particularly with reference to Figs. 1 and 3 of the drawing, that the arm 81 and the rocker bars 85 are arcuate and lie within the space between the rear edge of the wall 28 and the adjacent forward edge of the guide plate or apron 29. It is apparent, therefore, that as the bed 27 oscillates, the rocker arm 81 will similarly oscillate upon its pivot 80, moving the inner ends of rocker bars 85 upwardly and downwardly upon their pivots 86. This action brings about an agitation of the seed within the hopper, prevents the clogging of the machine by seed becoming jammed between the wall 28 and the apron 29, and also tends to move the seed inwardly of the hopper and into the path of the feeder fingers 32.

It will be understood that the feeder head and its feeder plate 31 rotate upon the post 25 independently of the bed 27 and its integral upwardly inclined wall 28. However, the forwardly projecting fork 50 is affixed to the bearing member 25 so that it oscillates with the bed plate 27.

In operation the seed, such as potatoes, cut to the proper or desired size, are fed into the hopper or bin 21 gravitating therein down the hopper plate 21 and through the openings 22 until they come to rest upon the feeder plate 31 as well as upon the outer edge of the wall 28 of the bed 27 and also upon the inwardly directed downwardly inclined apron or guide plate 29. With the vehicle in forward motion, oscillations are set up in shaft 41, which oscillations are transmitted by rods 39 and 47 to the forwardly projecting fingers 37 and 49 of the bed plate and feeder head respectively. These oscillations, obviously, are in opposed directions. The seed resting immediately upon the feeding fingers 32 are moved in a forward direction within the hopper toward the opening 36 in advance of the bearing post 30. In this travel they drop in front of shoulders 35 and upon the plate 65 and move thereon successively against the gates 52, being aided in such movement by the projections 63 of the feeder toes, thus being fed alternately from opposite sides into the opening 33 at the top of the chute as the fork 50 oscillates. In this forward feeding movement of the seed, the selector plate assists in the forward feeding movement of the seed immediately adjacent to the opening 33 and holds back any following seed until the selector plate is withdrawn or rocked upon its pivot 71 to retracted position. Immediately the fork moves to such position as to withdraw from locking engagement with a gate, the forward pressure of the seed, augmented by the feeder toe as well as the selector element 75 of the selector plate, forces the weighted gate to swing inwardly as shown to the left of Fig. 4 of the drawing, whereupon the seed is released and gravitates through opening 33 and into the chute 34. Immediately this occurs, the fork 50 moves to the reverse position liberating the gate at the opposite side of the finger 49 to permit the seed immediately adjacent thereto to drop into the chute 34 in the manner above described. These feeding operations of individual seed from opposite sides of the opening 33 continue as the vehicle advances as will be understood. During this seed feeding operation, the agitator mechanism at the rear of the feeding head is active in bringing about an oscillatory movement of the rocker arm 81 and the rocker bars 85 with which it is attached, thus agitating the seed by lifting it vertically so that it may pass into the path of the fingers 32 of the feeder plate. In this manner, clogging of the machine or injury to the seed is effectively prevented and moreover feeding of all of the seed to the path of the feeder fingers is assured.

The means for transmitting the power from the traction axle of the vehicle to the feeding mechanism here shown and described is one effective mechanism for bringing about the desired operations. However, it will be understood that any other desired means for bringing about the alternate movements of the fingers 37 and 49 may be utilized with equal effect.

The planting mechanism here illustrated provides a supporting platform above the axle of the vehicle with which it is associated, bringing about a relatively long discharge or feed pipe 34. In instances where a low drop of the seed is desirable, as might be the case with heavier seed such as potatoes, the entire hopper, its supporting base and the automatic feeding mechanism may be lowered to a suitable elevation above ground to meet these requirements. Thus, the supporting platform 19 may be located below the axle so that the distance between the feeding mechanism and the ground will be materially reduced and thus insure more accurate feeding of the seed as the vehicle advances. Such change in elevation of the supporting base or platform may be carried out without material variation of the power transmitting mechanism here illustrated and described.

From the foregoing it is obvious that I have provided means of relatively simple construction for bringing about the feeding of seed from the hopper one at a time to the discharge chute with the least possibility of damage to the seed, with a minimum of damage or breakage of the machine or any of its parts, and with the assurance that all of the seed contained within the hopper will be fed to the discharge chute.

I claim:

1. In a seed planting machine, a supporting bed having a discharge opening therein, a feeding head to support the seed to be planted mounted for reciprocating movement toward and away from said opening, means for moving said head, a gate disposed in the path of movement of seed from said head to said opening, and means for releasing said gate when the head moves in one direction and for locking the gate against movement when the head moves in reverse direction.

2. In a seed planting machine, a hopper, a supporting bed in said hopper having a discharge opening, a feeding head mounted for oscillatory movement on said bed and supporting the seed to be planted, fingers on said head to move said seed to said opening when the head is moved in one direction, a gate in the path of movement of said seed to said opening, means operable to release said gate when the head moves a predetermined distance in one direction, and means for locking said gate when the head is moved in the reverse direction.

3. In a seed planting machine, a hopper, a supporting bed in said hopper having a discharge opening, a feeding head to support the seed to be planted mounted for oscillation on said bed with its outer edge coinciding with said opening, a gate adjacent to said opening and in the path of movement of said outer edge, said gate normally locked in the path of seed moving from said head to said opening, means for releasing said gate, means for moving seed from said head to said opening, and means for oscillating said head.

4. In a seed planting machine, a hopper, a supporting bed in said hopper having a discharge opening therein, a feeding head to support the seed to be planted mounted for oscillation on said bed with its outer edge coincident with said opening, means for alternately feeding seed from opposite sides of said head to said opening as the head oscillates, gates interposed between said opening and opposite sides of said head, means for releasing said gates alternately, means interposed between opposite sides of said head and said opening for alternately kicking seed from said head toward said opening, and means for limiting the movement of seed from said kicking means to said opening.

5. In a seed planting machine, a supporting bed having a discharge opening therein, a feeding head to support the seed to be planted mounted for oscillatory movement upon said bed, spaced shoulders on said head to alternately move toward or away from said discharge opening as the head is reciprocated, means to move the seed one at a time into the path of said shoulders, gates normally locked in the path of seed moved by said shoulders toward said discharge opening, means operable when said shoulders have reached a predetermined position to release said gate, and means for oscillating said head.

6. In a seed planting machine, a feeding head to support the seed to be planted mounted for oscillatory movement upon said bed, a shoulder on said head to move alternately toward or away from said discharge opening as the head is moved, means to move a seed into the path of said shoulder as it advances toward said opening, a gate normally locked in the path of seed moving toward said opening, means operable when said shoulder has reached a predetermined position to release said gate, and means for oscillating said head.

7. In a seed planting machine, a supporting bed having a discharge opening therein, a feeding head to support the seed to be planted mounted for oscillatory movement upon said bed, spaced shoulders on said head to alternately move toward or away from said discharge opening as the head is reciprocated, means to move the seed one at a time into the path of said shoulders, a toe mounted in said bed in advance of each shoulder, means operable when the head has reached a predetermined position for moving said toe in the direction of said discharge opening, gates normally locked in the path of seed moved by said shoulders toward said discharge opening, means operable when said shoulders have reached predetermined positions to release said gates, and means for oscillating said head.

8. In a seed planting machine, a substantially circular horizontally disposed bed mounted at its center for oscillatory movement in a horizontal plane and having a discharge opening therein, a substantially circular head of less diameter than said bed overlying the latter and capable of oscillatory movement about the same axis as the latter, a pair of shoulders in spaced relationship on said head adjacent to said opening, means on said head for moving seed thereon in advance of said shoulders when the head moves in one direction, said bed having slots therein substantially concentric with the bed and extending to said opening, feeder toes mounted beneath said bed movable into and along said slots, means for moving said toes in said slots when the head has reached a predetermined position, and means for oscillating said head and bed simultaneously in opposite directions.

9. In a seed planting machine, a substantially circular horizontally disposed bed pivoted at its center for oscillatory movement in a horizontal plane and having a discharge opening at one of its edges, a substantially circular head of less diameter than said bed concentrically overlying the latter and capable of oscillatory movement independently of said bed, shoulders on said head one on each side of said opening, means on said head for moving seed toward said shoulders when said head moves in one direction, said bed having slots therein substantially concentric with the bed underlying said shoulders and extending toward said opening, feeder toes mounted for sliding movement beneath said bed and said slots, a projection on each toe movable through its slot when the head moves in one direction, a selector plate on each side of said opening movable against a seed to move the latter in the path of said projection, means for oscillating said bed and head in opposite directions, means for moving said feeder toes, and means for moving said selector plates.

10. In a machine for planting seed, a hopper to contain the seed having a discharge opening in the bottom thereof, a feeding head slidably mounted in the bottom of said hopper, a shoulder on said head for engaging the seed to be planted, said head movable toward or away from said opening, a normally locked gate mounted in said hopper disposed in the path of movement of seed propelled by said shoulder, a feeder toe underlying said head and movable toward or away from said opening, a selector member in said hopper offset from said head movable angularly toward or away from said path, means for moving said head, means for releasing said gate when the head has reached a predetermined position, means for moving said feeder toe, and means for moving said selector plate.

11. In a planting machine, a supporting bed for the seed having a discharge opening therein, said bed having slots therein on opposite sides of said opening and extending in the direction of the latter, feeder toes mounted beneath said bed and slots and movable in parallelism with the latter, means whereby each toe is projected through its respective slot when moved in the direction of said opening and is retracted therefrom when moved in the reverse direction, and means for moving said toes alternately.

12. In a planting machine, a supporting bed for the seed having a discharge opening therein, said bed having slots therein on opposite sides of said opening and extending in the direction of the latter, feeder toes mounted beneath said bed and slots and movable in parallelism with the latter, means whereby each toe is projected through its respective slot when moved in the direction of said opening and is retracted therefrom when moved in the reverse direction, means for moving seed from said slots in advance of said toes, and means for moving said toes.

13. In a planting machine, a horizontally disposed base, a supporting bed for the seed mounted for sliding movement above said base and in parallelism therewith, said base having a discharge opening therein, said bed having a slot extending toward said opening, a feeder toe pivoted for swinging movement intermediate its ends to said bed, a projection on said toe underlying said slot, means for rocking said toe on its pivot to extend said projection through said slot when said toe is slid in the direction of said opening and to retract said projection when moved in the reverse direction, and means for moving said bed.

14. In a seed planting machine, a substantially circular horizontally disposed bed pivoted at its center for oscillatory movement in a horizontal plane and having a discharge opening at one of its edges, a substantially circular head of less diameter than said bed concentrically overlying the latter and capable of oscillatory movement independent of said bed, shoulders on said head one on each side of said opening, means on said head for moving seed toward said shoulders when said head moves in one direction, said bed having slots therein substantially concentric with the bed underlying said shoulders and extending toward said opening, feeder toes mounted for sliding movement beneath said bed and said slots, means for moving said toes through said slots when said toes are slid in the direction of said opening and for retracting said toes when moved in the reverse direction, means for rotating said head, means for moving said toes, kicker plates mounted for vertical movement between the edges of said head and said bed, and means governed by movements of said bed for moving said kicker members.

15. In a seed planting machine, a substantially circular horizontally disposed bed pivoted at its center for oscillatory movement in a horizontal plane and having a discharge opening at its forward edge, a substantially circular head of less diameter than said bed concentrically overlying the latter and capable of oscillatory movement independently of said bed, means at the forward end of said head for feeding the seed to said discharge opening when the head is rotated, kicker bars pivoted between the rear edges of said head and the adjacent edges of said bed, a rocker member pivoted adjacent to said kicker members, a projection extending from said bed and adapted to oscillate said rocker member when said bed is oscillated, and yokes connecting said oscillatory member with said kicker members.

16. In a seed planting machine, a vehicle, a horizontally disposed base mounted on said vehicle having an opening near one edge thereof, a circular bed to support the seed to be planted mounted for oscillation on said base and having an opening in one edge thereof overlying the base opening, a circular head overlying said bed and pivoted independently of and concentrically therewith for oscilaltion, shoulders on said head adjacent to said opening, teeth on said head to force the seed toward said shoulders as said head is oscillated, said bed having arcuate slots therein leading toward said opening, feeder toes underlying said slots and movable toward or away from said opening, means for projecting said toes through said slots when said toes are moving toward said opening and for retracting the same when moving in the reverse direction, means offset from said slots for moving seed into the path of said feeder toes as the latter advance in their respective slots, kicker arms concentric with said bed and head at the rear junction thereof, means operated by said bed for moving said kicker arms in vertical directions, arms projecting from said bed and head, links connecting one of said arms with said offset means whereby the latter will be operated upon movement of said arm, gates carried by said arm normally locked between the feeder toes and said opening, a fork projecting from said bed for alternately locking and releasing said gates as the bed is oscillated, and means operated upon movement of said vehicle for alternately moving said arms.

References Cited in the file of this patent

UNITED STATES PATENTS

| | | |
|---|---|---|
| Re. 21,537 | Schmidt | Aug. 20, 1940 |
| 1,564,540 | Dinwiddie | Dec. 8, 1925 |
| 1,763,352 | Giles | June 10, 1930 |

FOREIGN PATENTS

| | | |
|---|---|---|
| 459,948 | Germany | of 1928 |